US008259742B2

(12) United States Patent
Pak et al.

(10) Patent No.: US 8,259,742 B2
(45) Date of Patent: Sep. 4, 2012

(54) HYBRID CHANNEL ASSIGNMENT METHOD AND ROUTER THEREOF

(75) Inventors: Woo-Guil Pak, Seoul (KR); Yong Lee, Seoul (KR); Sae-Woong Bahk, Seoul (KR); Yong-Seok Park, Seongnam-si (KR); Hyo-Hyun Choi, Seoul (KR); Sun-Gi Kim, Seoul (KR)

(73) Assignees: Samsung Electronics Co., Ltd., Suwon-Si (KR); Seoul National University Industry Foundation, Gwanak-Gu (KR)

( * ) Notice: Subject to any disclaimer, the term of this patent is extended or adjusted under 35 U.S.C. 154(b) by 283 days.

(21) Appl. No.: 12/078,800

(22) Filed: Apr. 4, 2008

(65) Prior Publication Data

US 2008/0247412 A1 Oct. 9, 2008

(30) Foreign Application Priority Data

Apr. 4, 2007 (KR) .................................. 2007-33365

(51) Int. Cl.
*H04L 12/28* (2006.01)

(52) U.S. Cl. ........ 370/431; 370/229; 370/235; 370/236; 370/254; 370/256; 370/437; 709/226; 709/229

(58) Field of Classification Search .................. None
See application file for complete search history.

(56) References Cited

U.S. PATENT DOCUMENTS

| 5,437,054 | A  | * | 7/1995  | Rappaport et al. | ............ 455/447 |
| 5,828,655 | A  | * | 10/1998 | Moura et al.     | .................. 370/236 |
| 5,978,387 | A  | * | 11/1999 | Sherman          | ......................... 370/468 |
| 6,219,554 | B1 | * | 4/2001  | Eswara et al.    | ............. 455/452.1 |
| 6,230,200 | B1 | * | 5/2001  | Forecast et al.  | ............... 709/226 |
| 6,272,348 | B1 | * | 8/2001  | Saario et al.    | ............... 455/452.1 |
| 6,816,500 | B1 | * | 11/2004 | Mannette et al.  | ............. 370/431 |
| 6,922,724 | B1 | * | 7/2005  | Freeman et al.   | ............... 709/223 |
| 2003/0013451 | A1 | * | 1/2003 | Walton         | .......................... 455/447 |
| 2003/0069918 | A1 | * | 4/2003 | Lu et al.      | ........................ 709/105 |
| 2003/0117999 | A1 | * | 6/2003 | Abrams et al.  | ................. 370/352 |
| 2003/0186705 | A1 | * | 10/2003 | Lahav et al.  | .................. 455/451 |

(Continued)

FOREIGN PATENT DOCUMENTS

KR 2004-69216 8/2004

(Continued)

OTHER PUBLICATIONS

"Centralized Channel Assignment and Routing Algorithms for Multi-channel Wireless Mesh Networks" proposed in ACM Mobile Computing and Communications Review (MC2R), vol. 8, No. 2, Apr. 2004.

(Continued)

*Primary Examiner* — Ayaz Sheikh
*Assistant Examiner* — Peter Chau
(74) *Attorney, Agent, or Firm* — Roylance, Abrams, Berdo & Goodman, L.L.P.

(57) ABSTRACT

A hybrid channel assignment method comprising the steps of negotiating among routers to select one router to act as a central server; collecting, at the selected router, information on an entire network transmitted from the other routers, and assigning channels based upon the information on the entire network; and reassigning channels of respective routers based upon dynamically-changing traffic characteristics. The hybrid channel assignment method can assign channels using both centralized processing and distributed processing in order to ensure optimally correct channel assignment consistent with present traffic characteristics. This as a result can prevent network resources from being wasted and also increase network capacity, thereby optimizing effective use of the network resources.

15 Claims, 16 Drawing Sheets

U.S. PATENT DOCUMENTS

| | | | |
|---|---|---|---|
| 2004/0071087 A1* | 4/2004 | Siev et al. | 370/235 |
| 2004/0082335 A1* | 4/2004 | Hirayama et al. | 455/450 |
| 2004/0240407 A1* | 12/2004 | Ehrsam et al. | 370/328 |
| 2005/0237935 A1* | 10/2005 | Chae et al. | 370/232 |
| 2007/0153702 A1* | 7/2007 | Alicherry et al. | 370/252 |
| 2008/0068978 A1* | 3/2008 | Clausen | 370/201 |

FOREIGN PATENT DOCUMENTS

| | | |
|---|---|---|
| KR | 2006-84443 | 7/2006 |
| WO | WO 03/067813 | 8/2003 |
| WO | WO 2005/032156 | 4/2005 |

OTHER PUBLICATIONS

"Interference-Aware Topology Control and QoS routing in Multi-Channel Wireless Mesh Networks" published MobiHoc, 2005.

T. Chiueh and A. Raniwala, "Architecture and Algorithms for an IEEE 802.11-Based Multi-Channel Wireless Mesh Network," vol. 3, Mar. 13-17, 2005, pp. 2223-2234.

* cited by examiner

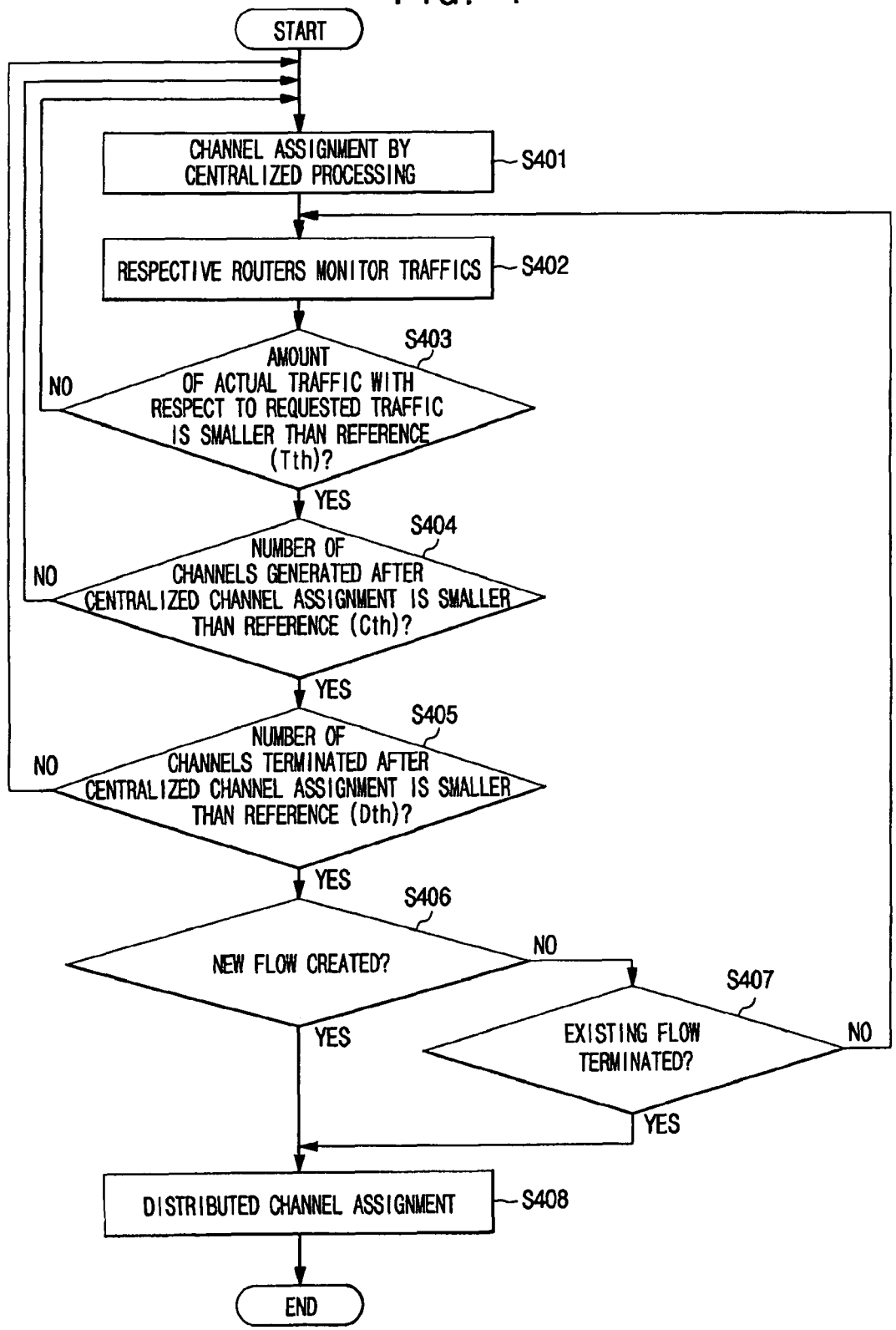

HYBRID CHANNEL ASSIGNMENT METHOD AND ROUTER THEREOF

CROSS-REFERENCE TO RELATED PATENT APPLICATION

This application claims the benefit under 35 U.S.C. §119(a) of Korean Patent Application No. 2007-0033365 for "HYBRID CHANNEL ASSIGNMENT METHOD AND ROUTER THEREOF", filed on Apr. 4, 2007, in the Korean Intellectual Property Office, the entire disclosure of which is hereby incorporated by reference.

BACKGROUND OF THE INVENTION

1. Field of the Invention

The present invention relates to a hybrid channel assignment method and a router thereof in Wireless Local Area Network (WLAN) mesh networks. More particularly, the invention relates to a hybrid channel assignment method and a router thereof, which can assign channels by centralized processing, and in the case of reallocable links, reassigning the assigned channels based upon dynamically-changing traffic characteristics.

2. Description of the Related Art

Conventional channel assignment methods used in WLAN mesh networks generally include centralized channel assignment and distributed channel assignment.

In the centralized channel assignment, a server collects information about all nodes, links and traffic characteristics, and based upon the collected information, selects channels to assign. In the distributed channel assignment method, a node selects a channel to use based upon its own information and information acquired from neighbor nodes.

Representative algorithms of the centralized channel assignment include "Centralized Channel Assignment and Routing Algorithms for Multi-channel Wireless Mesh Networks" proposed in ACM Mobile Computing and Communications Review (MC2R), Vol. 8, No. 2, April, 2004, and "Interference-Aware Topology Control and QoS Routing in Multi-Channel Wireless Mesh Networks" published in MobiHoc, 2005.

Both examples of the centralized channel assignment method include routers of the network and a channel assignment server. The channel assignment server may also function as a router, or may be provided separately from the router. FIGS. 1A to 1C illustrate a channel assignment process according to the centralized channel assignment.

FIG. 1A is a network topology prior to new channel assignment according to the centralized channel assignment.

As shown in FIG. 1A, the network includes a channel assignment server 110 and routers 120 to 160. The channel assignment server can also act as a router as mentioned above. In FIG. 1A, it is assumed that the channel assignment server 110 also acts as a router unless otherwise disclosed.

Respective routers 120 to 160 transmit traffic information necessary for channel calculation to the channel assignment server 110.

The channel assignment server 110 checks whether or not new channel assignment is necessary by referring to traffic information and so on, which is received from the respective routers 120 to 160.

If a new channel assignment is not necessary, the channel assignment server 110 does not perform channel assignment. If a new channel assignment is necessary, the server 110 searches for channels to be newly used via calculation. In this case, information on the channels to be newly used is transmitted, on a channel assignment request message, to the respective routers 120 to 160.

Describing the dotted parts of FIG. 1A in more detail, each of the routers 120 to 160 transmits traffic information to the channel assignment server 110.

Upon receiving the traffic information, the channel assignment server 110 assigns Channel 1, Channel 3, Channel 1, Channel 2 and Channel 1, respectively, to the router 120, the router 130, the router 140, the router 150 and the router 160.

FIG. 1B is a network topology during new channel assignment according to the centralized channel assignment.

Referring to FIG. 1B, it is assumed that new channel assignment is necessary due to decreased traffic between the router 120 and the router 150 and increased traffic between the router 140 and the router 150.

If traffic characteristics are greatly changed after the channel assignment, the channel assignment server 110 calculates channels to be newly used, and transmits information on the channels to be newly used to routers that require channel switching.

The traffic flow of FIG. 1B is changed from that of the previous channel assigned state. Here, based upon the traffic information, which is received in FIG. 1A, the channel assignment server 110 determines whether or not new channel assignment is necessary. If a new channel assignment is necessary, the channel assignment server 110 searches for the channels to be used via calculation. In FIG. 1B, it is required to reestablish the channels of the router 120, the router 140 and the router 150.

In this case, the channel assignment server 110 transmits a channel assignment request message to the routers 120, 140 and 150. The channel assignment request message includes information on the channels, which are selected to be newly used. This procedure is illustrated with dotted lines in FIG. 1B.

In this case, however, the channel of the routers 130 and 160 is not reestablished since the traffic flow between the routers 130 and 160 is not changed. Thus, the channel assignment server 110 does not transmit the channel assignment request message to the routers 130 and 160.

FIG. 1C is a network topology after new channel assignment according to the centralized channel assignment.

The channel assignment is finished when respective routers establish a new channel in response to the channel assignment request message. When the channel assignment request message is received along the paths as shown in FIG. 1B, the routers 120, 140 and 150 change the channels with reference to channel information in the channel assignment request message, the channel information describing the channels to be newly used. Referring to FIG. 1C, Channel 2 between the router 120 and the router 150 is terminated, and new Channel 2 is established between the router 140 and the router 150. This is because the channel assignment is made based upon the fact that the traffic between the router 120 and the router 150 decreases and the traffic between the router 140 and the router 150 increases.

According to the centralized channel assignment as described above, network performance can be enhanced. However, the centralized channel assignment requires a long process time since channel assignment is always carried out for the entire network. Due to the long process time, traffic packets may be lost or sessions may be frequently broken. In order to prevent these problems, the centralized channel assignment does not frequently assign channels. In this case, however, channels cannot be consistent with dynamically changing traffic, and thus network performance degrades.

As a representative algorithm of the distributed channel assignment, "Architecture and Algorithms for an IEEE 802.11-Based Multi-Channel Wireless Mesh Network" was published by Infocom, 2005. This algorithm uses the distributed channel assignment instead of the centralized channel assignment.

Unlike the centralized channel assignment, a network of the distributed channel assignment includes only routers without a channel assignment server. FIGS. 2A to 2C illustrates a channel assignment process according to the distributed channel assignment.

FIG. 2A is a network topology before new channel assignment according to the distributed channel assignment.

According to the distributed channel assignment, there are no channel assignment servers, and the routers also act as a channel assignment server.

Each of the routers receives traffic information from other routers, which are connected to a gateway therethrough. In this case, those routers, which transmit the traffic information, are referred to as lower level routers, and those routers, which receive the traffic information, are referred to as higher level routers. In FIG. 2A, router 210 acts as an higher level router, and routers 211 to 215, 220, 230, 240, 250, 260 and 270 act as lower level routers.

All the lower level routers are not required to transmit their own traffic information to the higher level router. That is, some of the lower level routers present in a predetermined depth transmit traffic information to the higher level router. Here, the predetermined depth corresponds to a circled area in FIG. 2A. Therefore, as designated with dotted lines, only the routers 211 to 215 transmit traffic information to the router 210, which acts as the higher level router.

The higher level router can balance traffic of the lower level routers directly connected thereto, by instructing the next lower level routers, which are in a lower level than the lower level routers directly connected to the higher level router, to connect to other lower level routers.

In the same method, all the routers perform channel assignments to their own lower level routers using information from the lower level routers.

For example, the router 210 of FIG. 2A receives traffic information from the routers 211 to 215, which are in the predetermined depth, and monitors whether or not traffic is balanced. In the same fashion, other higher level routers in the network can receive traffic from their own lower level routers and monitors the received traffic.

FIG. 2B is a network topology during new channel assignment according to the distributed channel assignment.

It is assumed that the traffic flow is changed from that shown in FIG. 2A, so that more amount of traffic is conveyed at the link between router 210 and router 211 than at the link between router 210 and router 212. In this case, router 210 instructs router 214 to connect as a lower level router of router 212 in order to balance the amount of traffic.

Specifically, router 210 sends a channel assignment request message to routers 211, 212 and 214, the channel assignment request message including information on the channels to be newly assigned. In FIG. 2B, this procedure is indicated with dotted lines. Then, a channel assignment will be made to disable the channel assigned to the link between router 211 and router 214, that is, a lower level router of router 211, thereby reducing the amount of traffic conveyed toward router 211.

FIG. 2C is a network topology after the new channel assignment according to the distributed channel assignment.

When the channel assignment request message is received, the lower level routers complete the channel assignment.

Referring to FIG. 2C, Channel 2 assigned to the link between routers 211 and 214 is disabled, and Channel 3 is newly assigned to the link between routers 212 and 214.

Then, traffic is transmitted through the newly assigned channels in the network.

In the distributed channel assignment, less packets are lost and less sessions are broken in the transmission traffic as compared to the centralized channel assignment. This is because the channel assignment is performed by each node. However, since entire network information is not used to assign channels, the performance of the distributed assignment is inferior to that of the centralized channel assignment.

In the case of the centralized channel assignment, channel assignment consistent with the actual network situation is impossible owing to a long update cycle. In the centralized channel assignment, when the channel assignment server is in trouble, the entire network loses its functionality. In the case of assigning channels by the distributed channel assignment, channel assignment may be incorrect since it is performed without information on the entire network.

SUMMARY OF THE INVENTION

Exemplary embodiments of the present invention address at least the above problems and/or disadvantages and provide at least the advantages described below. Accordingly, an aspect of exemplary embodiments of the present invention provides a hybrid channel assignment method, which uses a hybrid channel assignment algorithm that can enable both centralized processing and distributed processing. The hybrid channel assignment method performs localized channel assignment based upon dynamic traffic characteristics by the distributed processing during a long channel assignment cycle, which would otherwise act as a drawback of the centralized processing. Exemplary embodiments of the present invention also provide a router, which can carry out the hybrid channel assignment method.

According to an aspect of exemplary embodiments the invention, the hybrid channel assignment method comprises negotiating among routers to select one router to act as a central server; collecting, at the selected router, information on an entire network transmitted from the other routers, and assigning channels based upon the information on the entire network; and reassigning channels of respective routers based upon dynamically-changing traffic characteristics.

Exemplary embodiments of the present invention further provide that the procedure of assigning by the selected router may include a procedure of setting a link, through which real-time traffic is conveyed or an amount of traffic exceeding a predetermined reference value is conveyed, as a non-reallocable link.

Exemplary embodiments of the present invention further provide that other links, except for the non-reallocable link, may be set as reallocable links.

Exemplary embodiments of the present invention further provide that a router, which belongs to the reallocable links, may reassign a channel based upon dynamically-changing traffic characteristics.

Exemplary embodiments of the present invention further provide that a router, which belongs to the non-reallocable links, may maintain a channel assigned by the selected router.

Exemplary embodiments of the present invention further provide that a the non-reallocable link may be reassigned as a reallocable link when real-time traffic is not conveyed any longer through the non-reallocable link or an amount of traffic conveyed through the non-reallocable link does not exceed the predetermined reference value.

Exemplary embodiments of the present invention provide that the hybrid channel assignment method may further comprise the step of transmitting a channel assignment request message including assigned channel information to the respective routers in the case of channel assignment or channel reassignment.

Exemplary embodiments of the present invention provide that the hybrid channel assignment method may further comprise the step of reassigning a channel assigned to a link to a router, which did not transmit traffic information, based upon dynamically-changing traffic characteristics.

Exemplary embodiments of the present invention provide that the hybrid channel assignment method may further comprise the step of reassigning channels at respective routers based upon dynamically-changing traffic characteristics if a flow considered in the assigning at the selected router is terminated.

Exemplary embodiments of the present invention provide that the hybrid channel assignment method may further comprise the steps of comparing network performance resulting from the assigning at the selected router with that resulting from the reassigning at respective routers; and if a compared performance difference is not smaller than a predetermined reference value, reassigning, at the selected router, channels of the entire network.

According to another aspect of exemplary embodiments of the invention, the router includes a traffic information collector for receiving traffic information from other routers and managing information on an entire network; a reallocable link setter for setting a reallocable or non-reallocable link with reference to the traffic information stored in the traffic information collector; and a channel assigner for assigning channels with reference to the information on the entire network, wherein the channel assigner assigns a channel to a reallocable link based upon dynamically-changing traffic characteristics, whereby the router performs hybrid channel assignment.

Exemplary embodiments of the present invention provide that the reallocable link setter may set a link, through which real-time traffic is conveyed or an amount of traffic exceeding a predetermined reference value is conveyed, as a non-reallocable link.

Exemplary embodiments of the present invention further provide that the reallocable link setter may set other links, except for the non-reallocable link, as reallocable links.

Exemplary embodiments of the present invention further provide that the reallocable link setter may reassign the non-reallocable link as a reallocable link when real-time traffic is not conveyed any longer through the non-reallocable link or an amount of traffic conveyed through the non-reallocable link does not exceed a predetermined reference value.

Exemplary embodiments of the present invention further provide that the channel assigner may transmit a channel assignment request message including assigned channel information to respective other routers.

BRIEF DESCRIPTION OF THE DRAWINGS

The above and other aspects, features, and advantages of certain embodiments of the present invention will be more apparent from the following detailed description when considered in conjunction with the accompanying drawings, in which:

FIG. 4 is a flowchart illustrating an algorithm of a hybrid channel assignment method of an exemplary embodiment of the invention;

Throughout the drawings, the same drawing reference numeral will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In exemplary embodiments of the present invention, a WLAN mesh network includes mesh routers (hereinafter referred to as "routers") and software mounted on the routers. The routers may be divided into a router, which acts as a channel assignment server, and routers, which act as channel assignment clients.

Figure 1A:
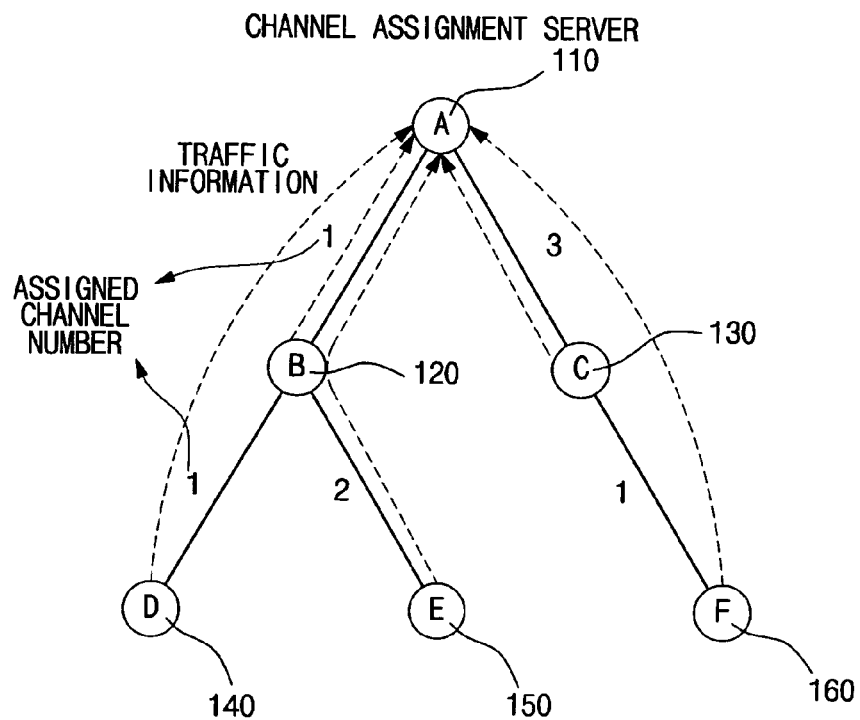
FIG. 1A is a network topology prior to new channel assignment according to a centralized channel assignment.
Figure 1B:
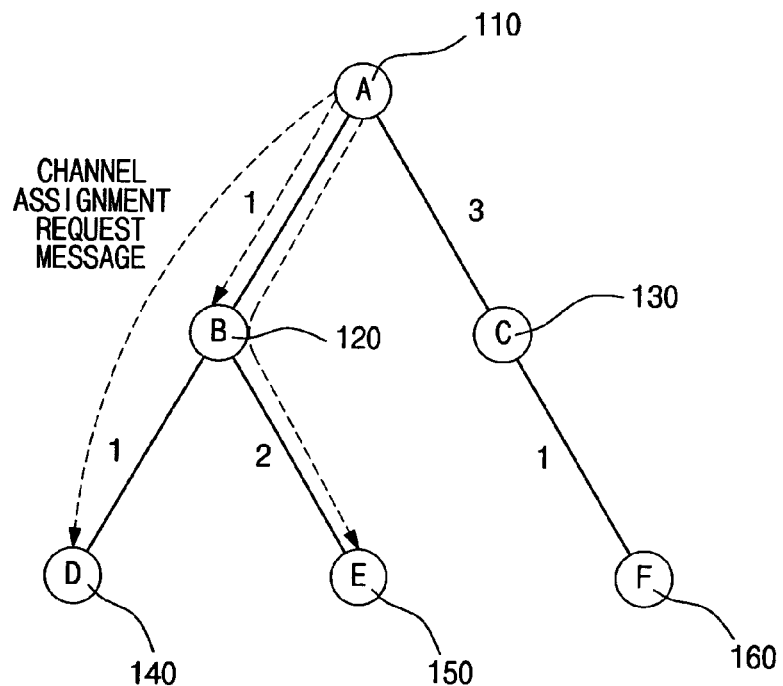
FIG. 1B is a network topology during new channel assignment according to a centralized channel assignment.
Figure 1C:
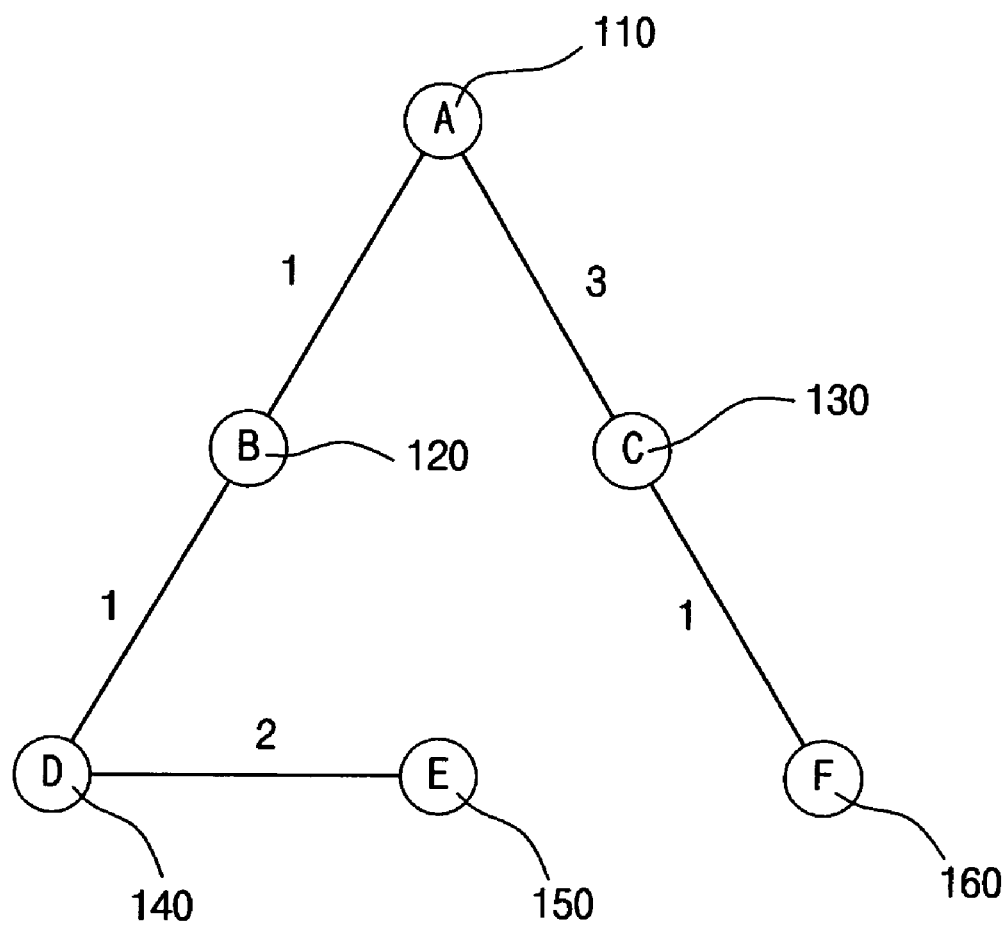
FIG. 1C is a network topology after new channel assignment according to a centralized channel assignment.
Figure 2A:
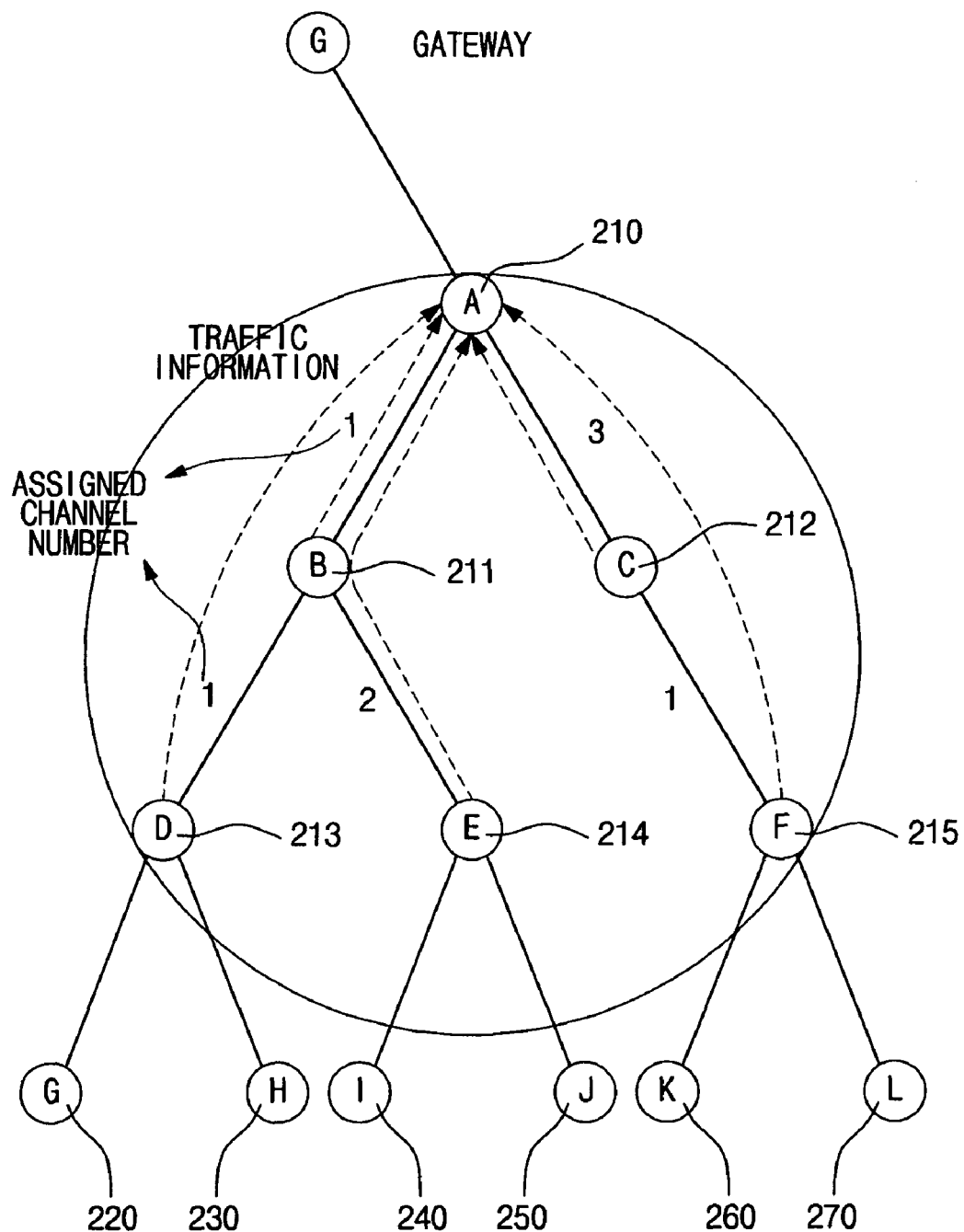
FIG. 2A is a network topology before new channel assignment according to a distributed channel assignment.
Figure 2B:
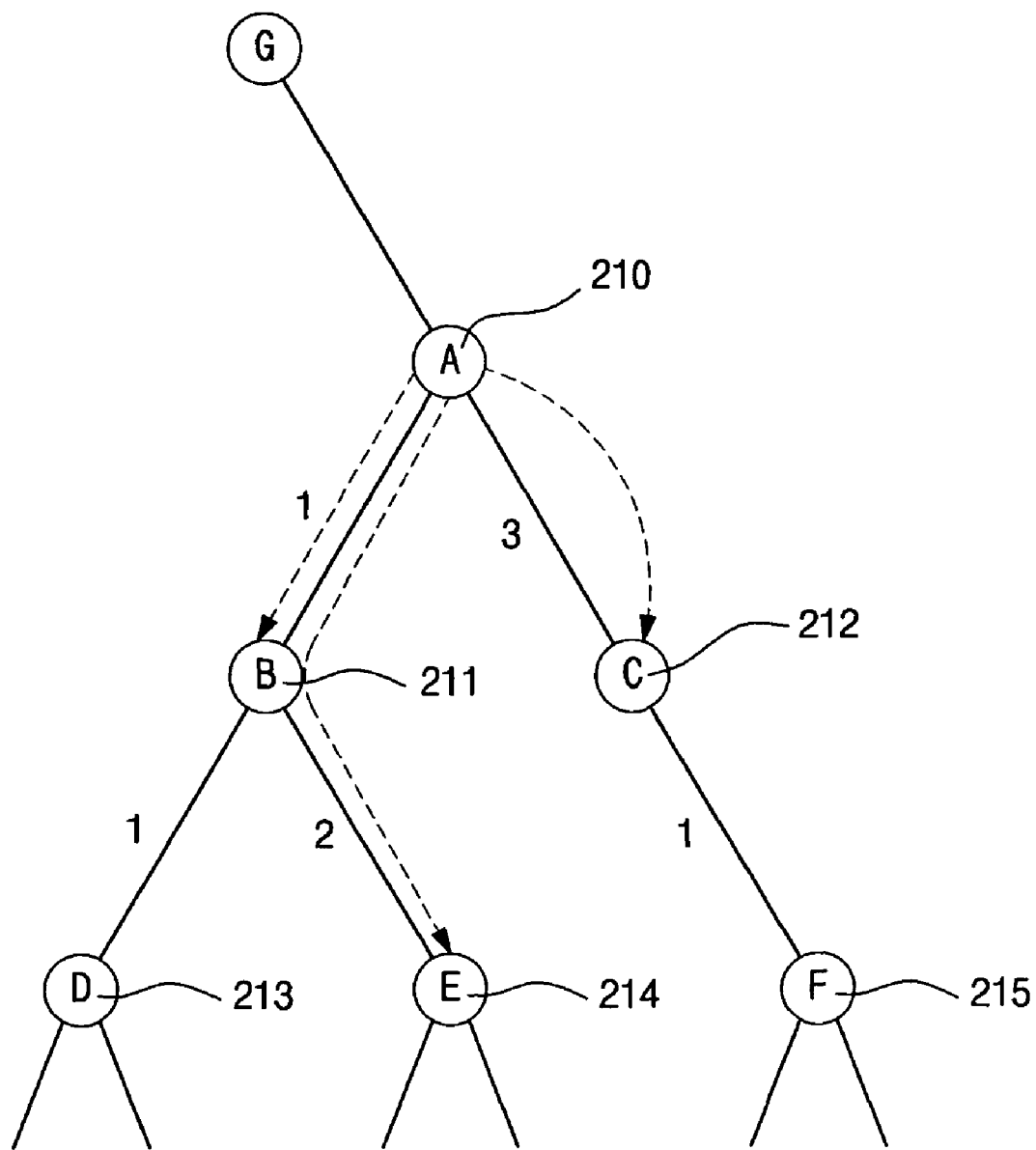
FIG. 2B is a network topology during new channel assignment according to a distributed channel assignment.
Figure 2C:
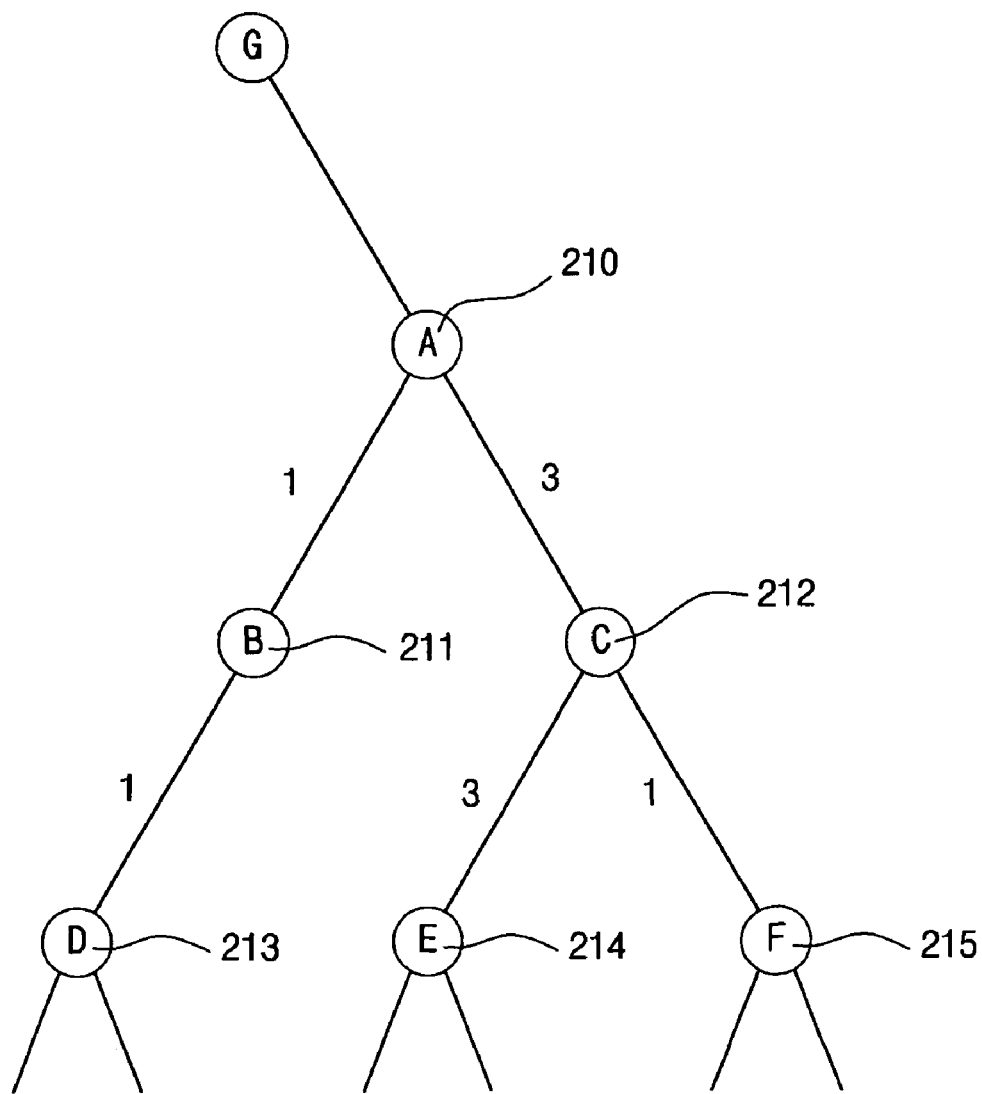
FIG. 2C is a network topology after new channel assignment according to a distributed channel assignment.
Figure 3:
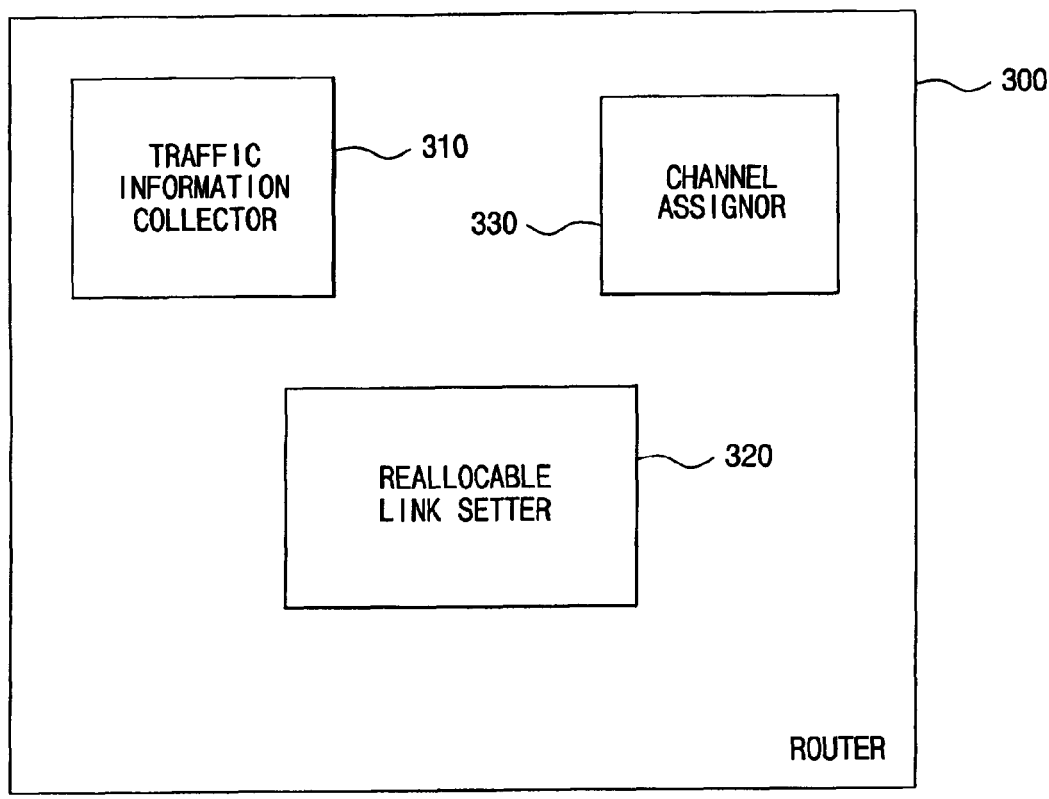
FIG. 3 is a block diagram illustrating the construction of a router that carries out a hybrid channel assignment method of an exemplary embodiment of the invention.

FIG. 3 is a block diagram illustrating the construction of a router 300 that carries out a hybrid channel assignment method of an exemplary embodiment of the invention.

The router 300 includes a traffic information collector 310, a reallocable link setter 320 and a channel assigner 330.

The traffic information collector 310 receives traffic information from other routers, and manages information on the entire network.

The reallocable link setter 320 sets reallocable links and non-reallocable links with reference to traffic information stored in the traffic information collector 310.

The channel assigner 330 performs channel assignment with reference to the information of the entire network, and performs channel reassignment with reference to dynamically-changing traffic characteristics.

FIG. 4 is a flowchart illustrating an algorithm of a hybrid channel method of an exemplary embodiment of the invention.

The hybrid channel assignment algorithm, proposed in an exemplary embodiment of the invention, includes two main processes. The first process is a centralized channel assignment process, which collects information on the entire network, and performs channel assignment based upon the network information.

The second process is a distributed channel assignment process, which performs channel assignment based upon dynamically-changing traffic characteristics after the centralized channel assignment process. Now, the respective processes will be described more fully.

First, in the centralized channel assignment process, routers negotiate with each other to select one router, which will act as a central server. The selected router (hereinafter referred to as "server router") performs channel assignment in the entire network using network information (e.g., traffic information) transmitted from the routers. Even after the channel assignment, if it is determined that channels currently assigned in the network are not adequate for given traffic information, the server router calculates the channels of the entire network.

Channel assignment information is transmitted to respective routers, each of which assigns its channel based upon given channel assignment information. The central server transmits flow information, used in its channel assignment, to respective routers.

The centralized channel assignment process assigns the channels of the entire network and also selects links, each of which has a channel that can be changed by distributed processing. Herein, a link having a channel that can be changed by distributed processing (distributed channel assignment process) is defined "reallocable link." On the other hand, a link having a channel that can be changed by centralized processing (centralized channel assignment process) is defined by "non-reallocable link." Accordingly, in the case where channel assignment is performed by the distributed processing after performed by the centralized processing, the distributed processing is performed on only reallocable links.

The reallocable links and the non-reallocable links will be described more fully later with reference to FIGS. 5A and 5B.

The next process is a channel reassignment process by the distributed processing.

Respective routers perform monitoring on traffics which they process. When a new traffic occurs, an existing traffic is terminated, or traffic characteristics are greatly changed, each router adds new flow information thereof to existing flow information transmitted from the central server and assigns a new channel according to the new flow information. The assigned channel information and the added new flow information are transmitted to the other routers. When the assigned channel information and the added new flow information are received, the routers update their flow information to be the newest, and perform channel assignment if necessary.

All the routers are required to exchange their flow information and so on with the other routers using a control packet. Furthermore, the centralized processing is performed only when traffic is not efficiently processed by the distributed processing or the entire network has a small amount of traffic, but in normal situations, channel assignment is generally performed by the distributed processing. For example, channel assignment is performed by the centralized processing in the following situation: When a difference between the amount of actual transmitted traffic and the amount of traffic requested by a flow is smaller than a given reference value, a destination router, which manages information on respective flows, requests the channel assignment server to perform entire channel assignment. In addition, when a difference between traffic information that the channel assignment server received from respective routers and existing traffic information used in an entire channel assignment is larger than or the same as a given reference value (e.g., a total of flow numbers and the amount of traffic of respective flows), the entire channels are assigned. Otherwise, channel assignment is performed by only the distributed processing.

The hybrid channel assignment method of an exemplary embodiment of the invention is generally carried out as follows: First, the server router performs channel assignment by centralized processing in S401. Respective routers monitor traffic flows, and transmit related information to the server router in S402.

The server router determines whether or not the amount of actual traffic with respect to the requested traffic is smaller than a given reference value in S403. If the amount of actual traffic with respect to the requested traffic is not smaller than a given reference value, which corresponds to a case where the entire network has a great amount of traffics, channel assignment should be performed by centralized processing. Thus, the process returns to the step S401.

If the amount of actual traffic with respect to the requested traffic is smaller than a given reference value, the server router determines whether or not the number of channels generated after the channel assignment by centralized processing is smaller than a reference value in S404. If the number of channels generated after the channel assignment by centralized processing is not smaller than a reference value, the process also returns to the step S401. However, if the number of channels generated after the channel assignment by centralized processing is smaller than a reference value, the server router determines whether or not the number of channels terminated after the channel assignment by centralized process is smaller than a reference value in S405.

If the number of channels terminated after the channel assignment by centralized process is not smaller than a reference value, the server router performs channel assignment by centralized processing, and if the number of channels terminated after the channel assignment by centralized process is smaller than a reference value, the server router determined whether or not a new flow is created in S406.

If a new flow is created, the server router performs channel assignment by distributed processing in S408. If a new flow is not created, the server router determines whether or not an existing flow is terminated in S407. If no existing flow is terminated, the server router performs channel assignment by distributed processing in S408.

Figure 5A:
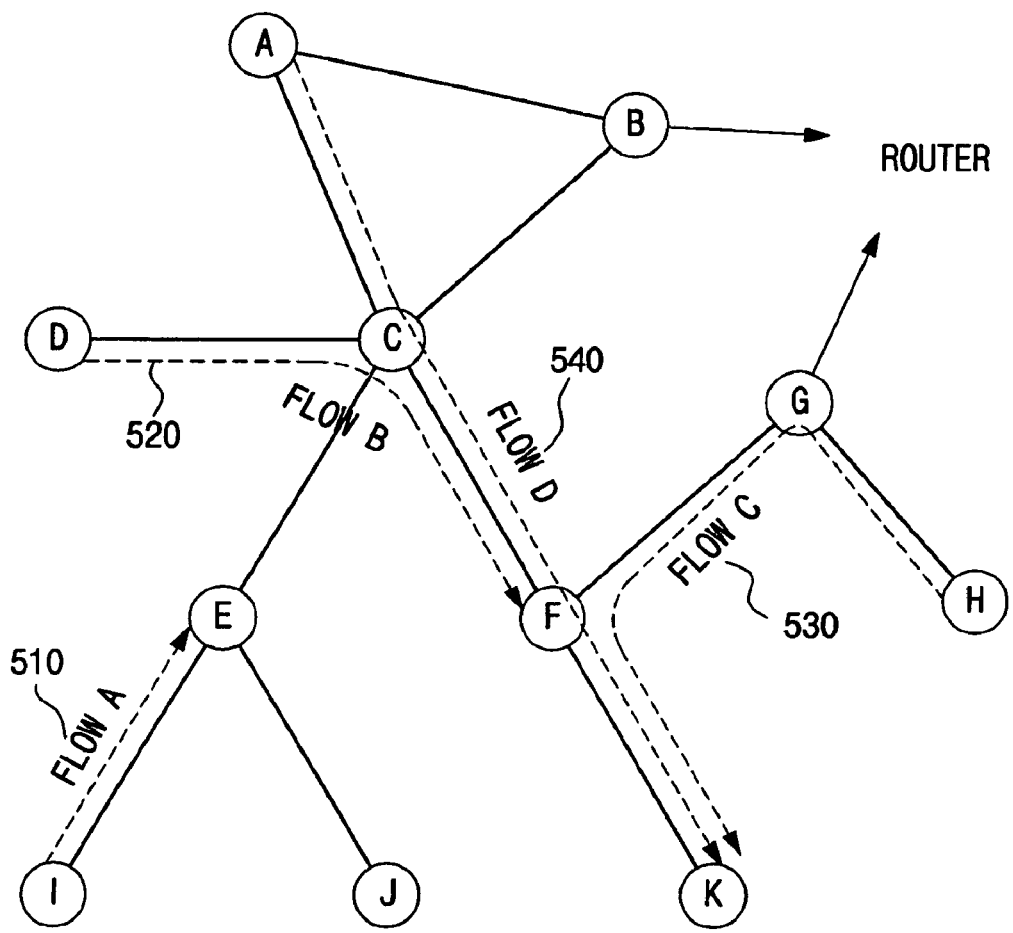
FIG. 5A is a network topology illustrating traffic flows in a network.
Figure 5B:
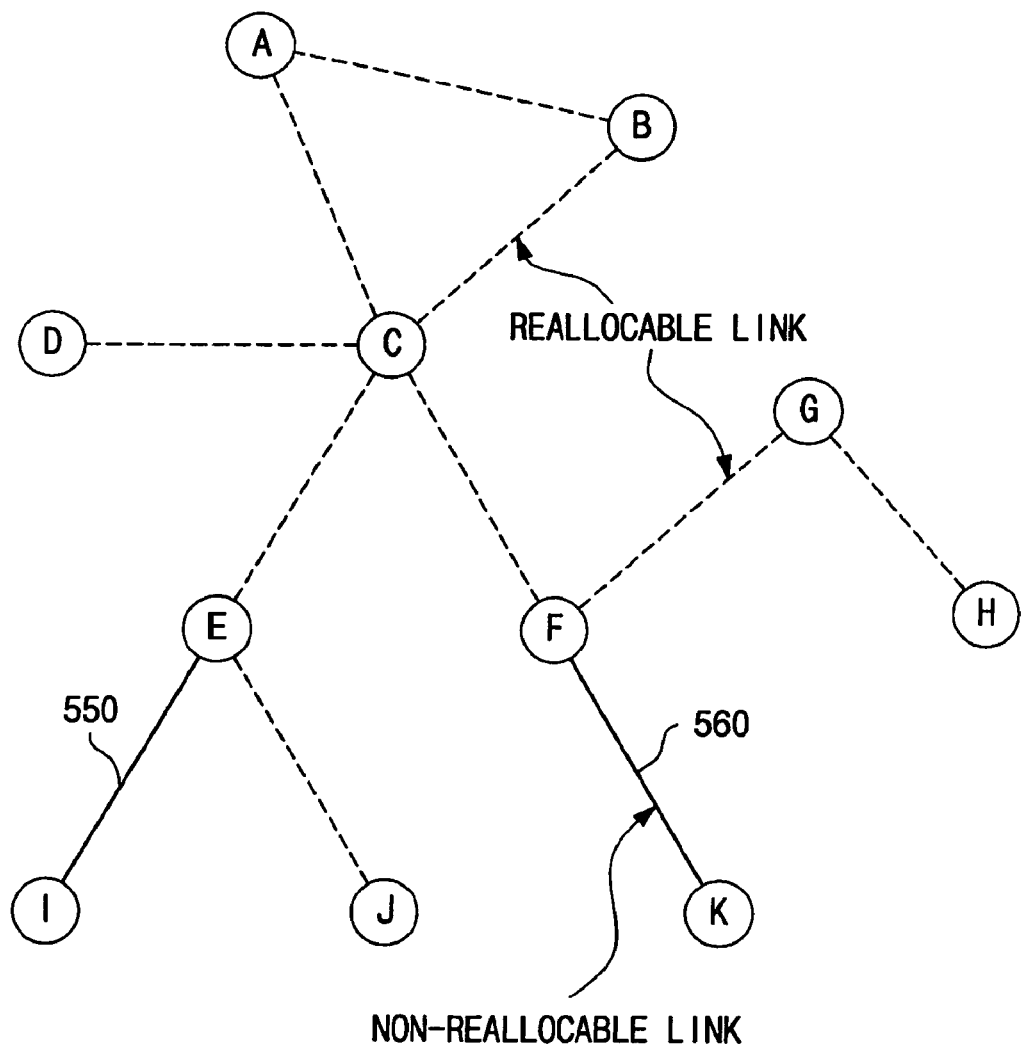
FIG. 5B is a network topology illustrating an assignment process of reallocable links and non-reallocable links according to an exemplary embodiment of the invention in the network of FIG. 5A.

FIG. 5A is a network topology illustrating traffic flow in a network, and FIG. 5B is a network topology illustrating the assignment of reallocable links and non-reallocable links in an exemplary embodiment of the invention.

The assignment of reallocable links is aimed to prevent packet loss that may occur when a channel is changed by distributed processing, and also to prevent the channel of a link, where traffics sensitive to packet transmission delay flow, from being frequently changed. Accordingly, only predetermined links are selected as reallocable links, except for some links where real-time traffics are conveyed or traffic exceeding a reference value Trealloc are conveyed. In this case, the reference value Trealloc is set by a channel assignment router.

In the case of distributed processing, only those links satisfying the above criteria can be selected as reallocable links. Channels are not assigned again in the case of non-reallocable links. However, the non-reallocable links can also be selected as reallocable links when real-time traffic is not conveyed anymore or the amount of traffic decreases below a reference value.

FIG. 5A is a network topology illustrating traffic flows in the network.

In this network, the reference value Trealloc is supposed to be 5 Mbps. In addition, Flow A 510 indicates real-time traffic 1 Mbps, Flow B 520 indicates non-real-time traffic 2 Mbps, Flow C 530 indicates non-real-time traffic 3 Mbps, and Flow D 540 indicates non-real-time traffic 2 Mbps.

Here, real-time traffic is conveyed at a link between a router I and a router E where Flow A 510 is conveyed. Non-real-time traffic is above Trealloc or 5 Mbps at a link between a router F and a router K. Accordingly, the links of the network shown in FIG. 5A are set as reallocable links and non-reallocable links as shown in FIG. 5B.

FIG. 5B is a network topology illustrating an assignment process of reallocable links and non-reallocable links according to an exemplary embodiment of the invention in the network of FIG. 5A.

Dotted lines indicate reallocable links, and solid lines indicate non-reallocable links. Here, channel reassignment is not allowed for a link 550 between router E and router I or a link 560 between router F and router K. However, for links other than link 550 and link 560, channel reassignment can be performed by distributed processing even after the channel assignment by centralized processing.

Figure 6:
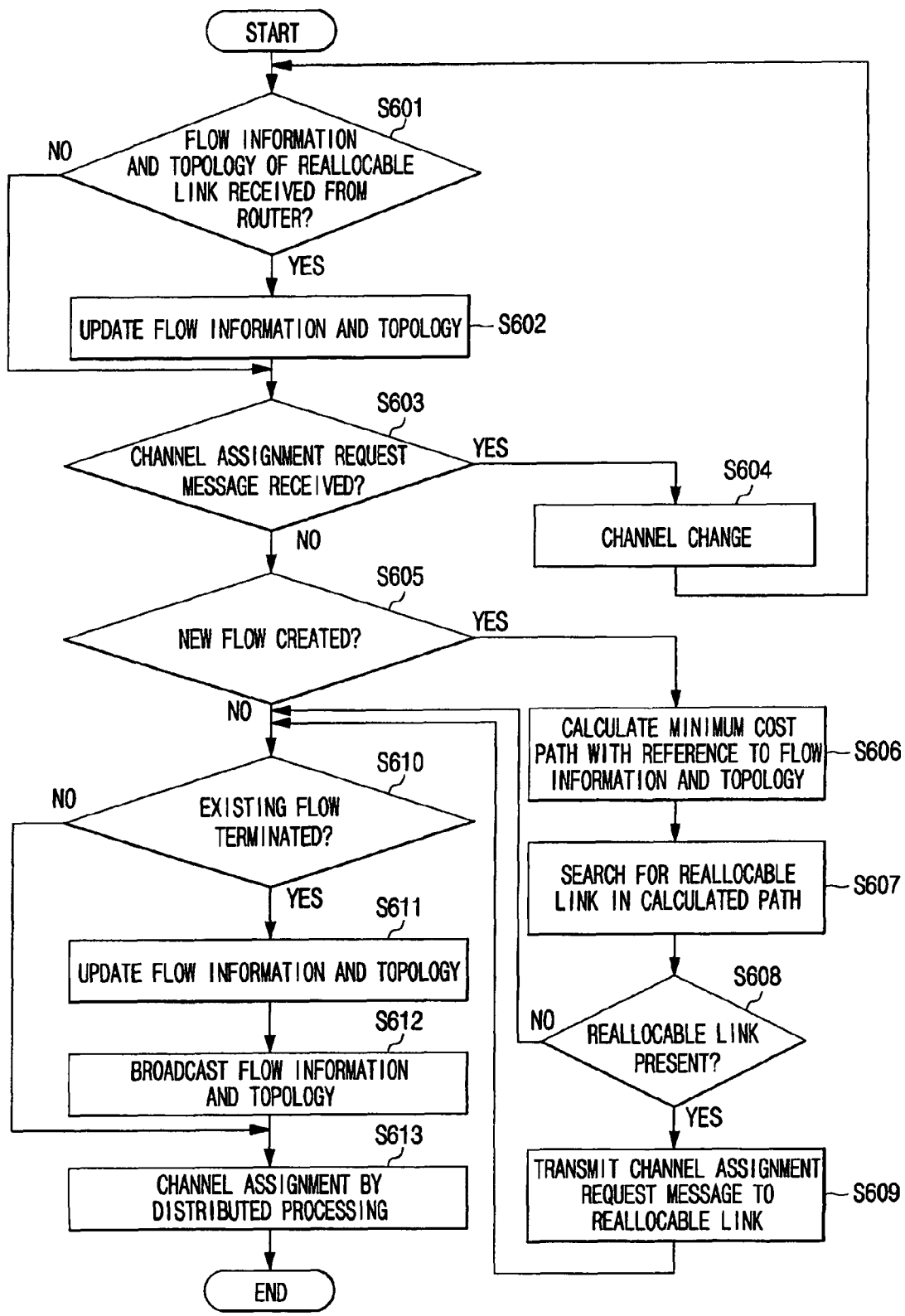
FIG. 6 is a flowchart illustrating a channel assignment process by distributed processing at each router in the hybrid channel assignment method of an exemplary embodiment of the invention.

FIG. 6 is a flowchart illustrating a channel assignment process by distributed processing at each router in the hybrid channel assignment method of an exemplary embodiment of the invention.

The router determines whether or not flow information and topology information on reallocable links are received from another router in S601. If the above-mentioned information is received, the router updates flow information and topology information with reference to the received information in S602. Otherwise, the router directly proceeds to S603.

In this case, the router determines whether or not a channel assignment request message is received in S603. If a channel assignment request message is received, the router changes a channel in 604.

If a channel assignment request message is not received, the router determines whether or not a new flow is created in S605. If a new flow is created, the router calculates a minimum cost path with reference to the flow information and the topology information in S606, and searches for reallocable links in the minimum cost path in S607.

The router determines whether or not a reallocable link is present in S608. If the reallocable link is present, the router transmits a channel assignment request message to the reallocable link in S609. Otherwise, the router directly proceeds to S610.

In S610, the router determines whether or not an existing flow is terminated. If an existing flow is terminated, the router updates the flow information and the topology information. However, if an existing flow is not terminated, the router skips S611 and S612, but directly proceeds to S613.

Routers reassign channels by distributed processing in S613. Then, the channel assignment process by distributed processing in the hybrid channel assignment method of an exemplary embodiment of the invention is finished.

Figure 7A:
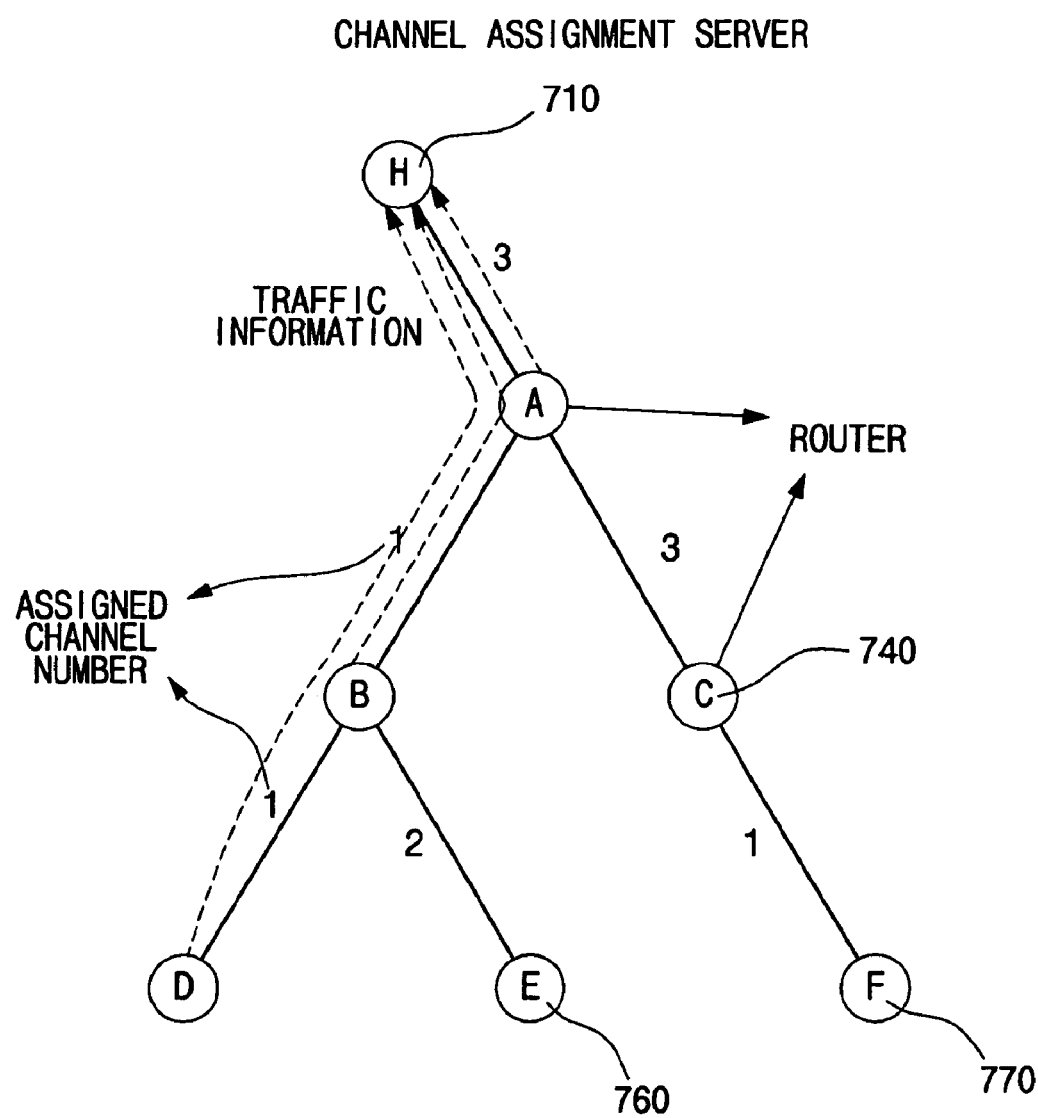
FIG. 7A is a network topology prior to channel assignment by centralized processing according to an exemplary embodiment of the invention.

FIG. 7A is a network topology prior to channel assignment by centralized processing according to an exemplary embodiment of the invention.

When a very small amount of traffic is processed by a specific router, traffic information may not be transmitted to a channel assignment server 710. Referring to FIG. 7A, a router 740 and a router 770 do not transmit the traffic information to the channel assignment server.

In the case of a router, which is newly added to the network, the channel assignment server 710 may not receive traffic information. Referring to FIG. 7A, the channel assignment server 710 does not receive traffic information from a router 760. Here, channels assigned by the channel assignment server 710 may be reassigned by distributed processing.

Figure 7B:
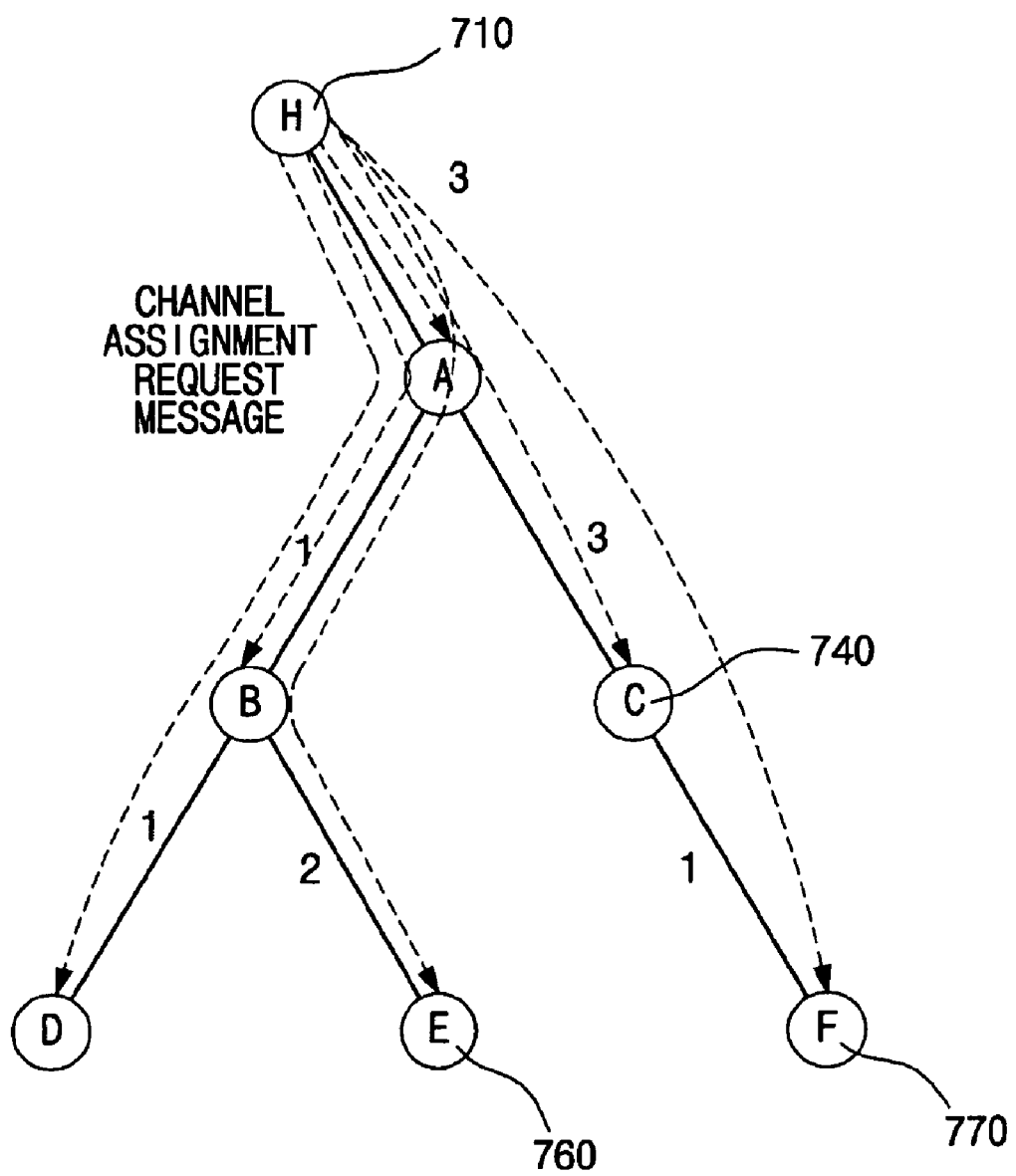
FIG. 7B is a network topology during channel assignment by centralized processing according to an exemplary embodiment of the invention.

FIG. 7B is a network topology during channel assignment by centralized processing according to an exemplary embodiment of the invention.

Each of the routers, after receiving a channel assignment request message from the channel assignment server 710, performs channel setting of an interface using a given channel. Traffic information used in the channel assignment are transmitted, on the channel assignment request message, to respective routers.

Figure 7C:
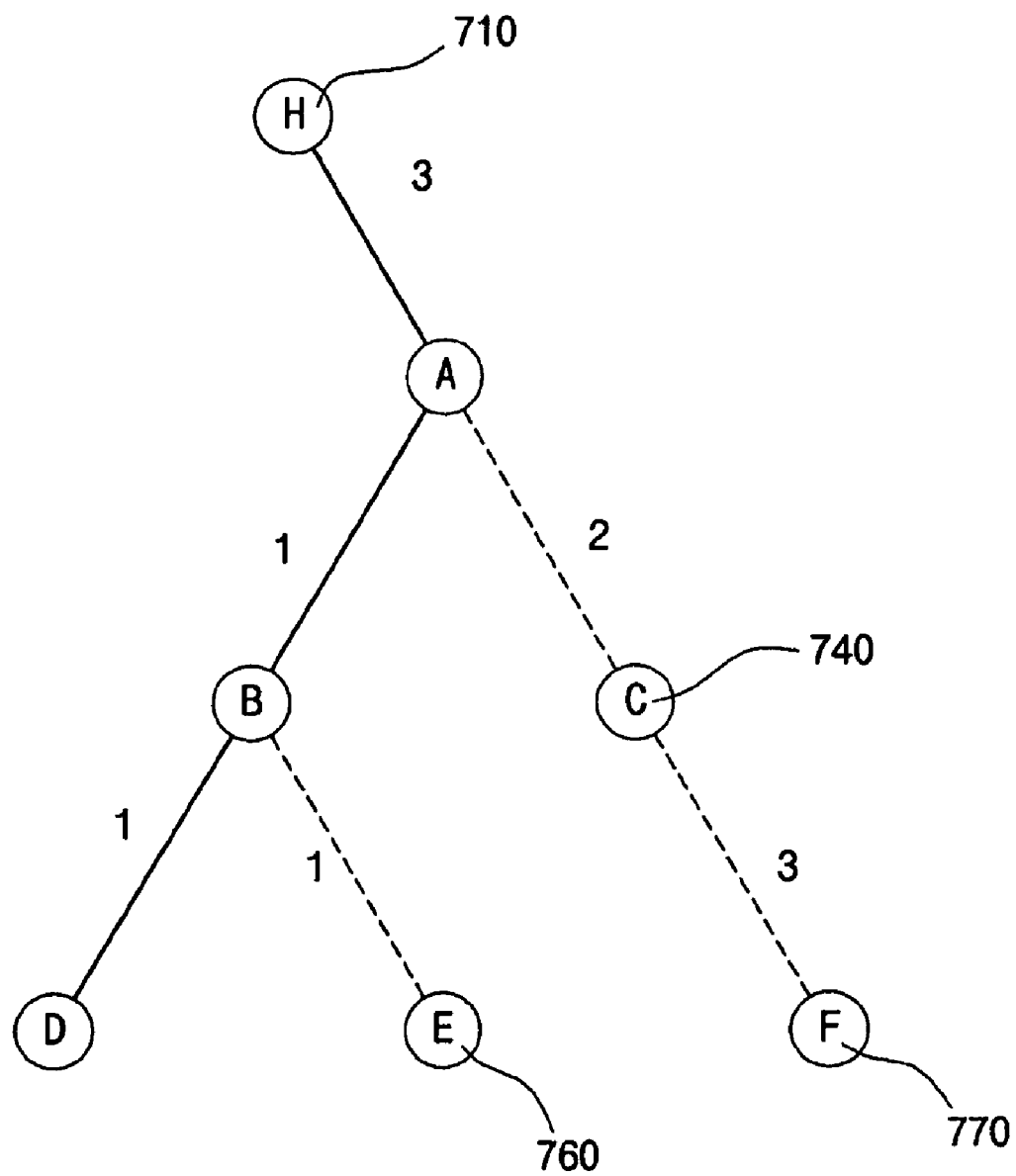
FIG. 7C is a network topology after channel assignment by centralized processing according to an exemplary embodiment of the invention.

FIG. 7C is a network topology after channel assignment by centralized processing according to an exemplary embodiment of the invention.

In FIG. 7C, dotted lines indicate links that did not receive traffic information when the channel assignment server assigned channels by centralized processing or otherwise have a small amount of traffic. Accordingly, these links are not reassigned by distributed processing when traffic distribution is changed. In addition, when flows considered in the channel assignment are terminated, corresponding links become reallocable by distributed processing.

Figure 8A:
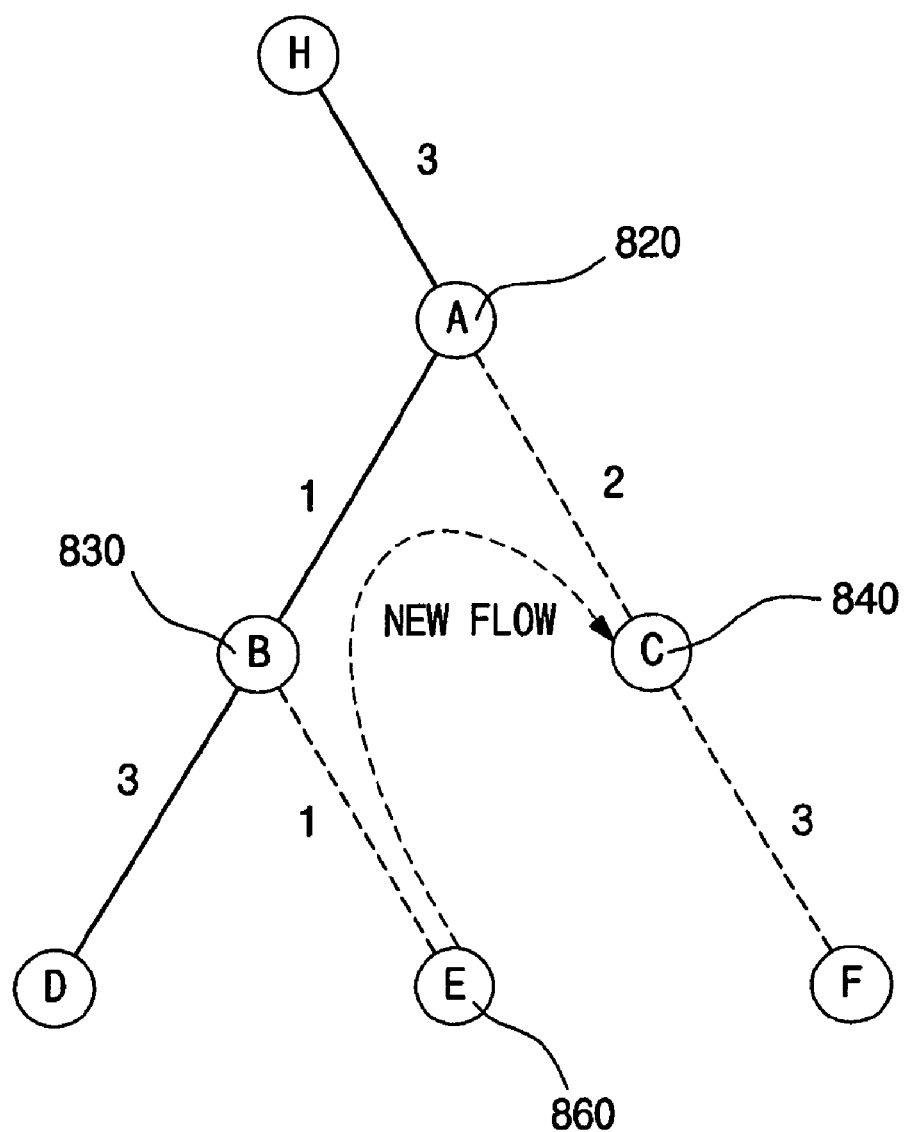
FIG. 8A is a network topology prior to channel assignment by distributed processing according to an exemplary embodiment of the invention.

FIG. 8A is a network topology prior to channel assignment by distributed processing according to an exemplary embodiment of the invention.

When a new flow is created, the flow is conveyed through a transmittable path by an existing network connection structure. For example, in FIG. 8A, traffic flows in the following sequence: router 860, router 830, router 820, and then router 840.

However, since the new flow is not considered in the existing connection structure, the new flow may degrade the performance of the existing connection structure. Accordingly, assignment of a new channel is required.

Figure 8B:
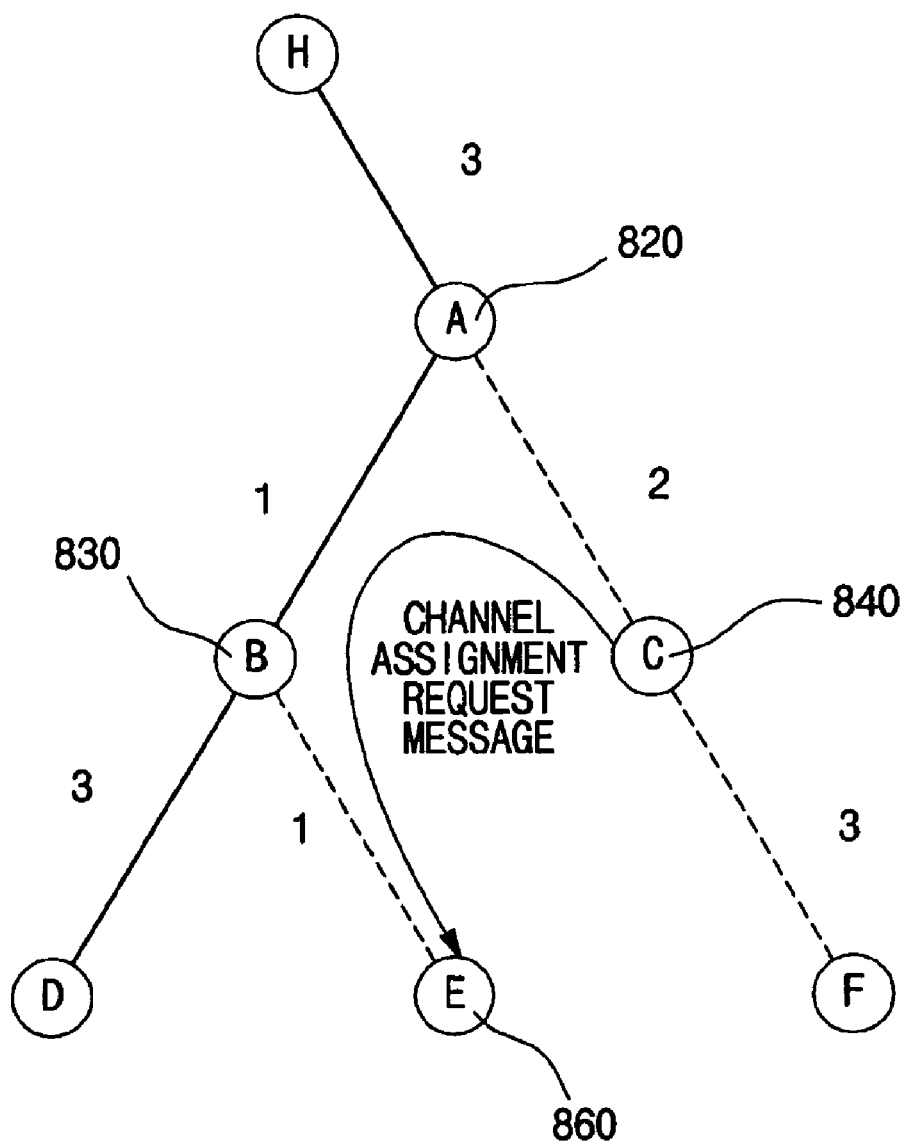
FIG. 8B is a network topology during channel assignment by distributed processing according to an exemplary embodiment of the invention.

FIG. 8B is a network topology during channel assignment by distributed processing according to an exemplary embodiment of the invention.

Respective routers always monitor the flow of traffic transmitted thereto from a specific router, that is, the amount of traffic related with the flow. If a new flow is not considered in centralized processing, a destination router of the new router attempts channel assignment by distributed processing.

First, in the existing network connection structure, channels are assigned according to links in order to achieve optimum performance in consideration of existing flows. This requires an ability to accept the new flow without minimizing an effect on the existing connection structure. For this, the destination router of the new flow divides respective links into non-reallocable links (through which existing flows are conveyed) and reallocable links (through which the existing flows are not conveyed). Information on the connection structure of the entire network is received from the channel assignment server.

Based upon such information, the destination router searches for an efficient measure of resources in relation to reallocable links by using an algorithm used in the channel assignment server, but leaves non-reallocable links in the present state. The destination router transmits a channel assignment message to related routers to newly assigned channels. Here, the related routers indicate the routers that must change a network connection structure in response to the assignment of a new channel to a reallocable link.

As a characteristic feature distinct from conventional methods, channels are assigned in consideration of reallocable links in order to accept the new flow without an effect on existing flows.

The destination router 840 of the new flow checks whether or not the channel assignment for the new flow can be enabled through the reallocable links of the links, which were assigned during centralized processing. If the channel assignment can be enabled, the destination router 840 transmits a channel assignment request message to corresponding routers so that the corresponding routers assign new channels through the reallocable links. As shown in FIG. 8B, the router 840 sends the channel assignment request message to the router 860.

Figure 8C:
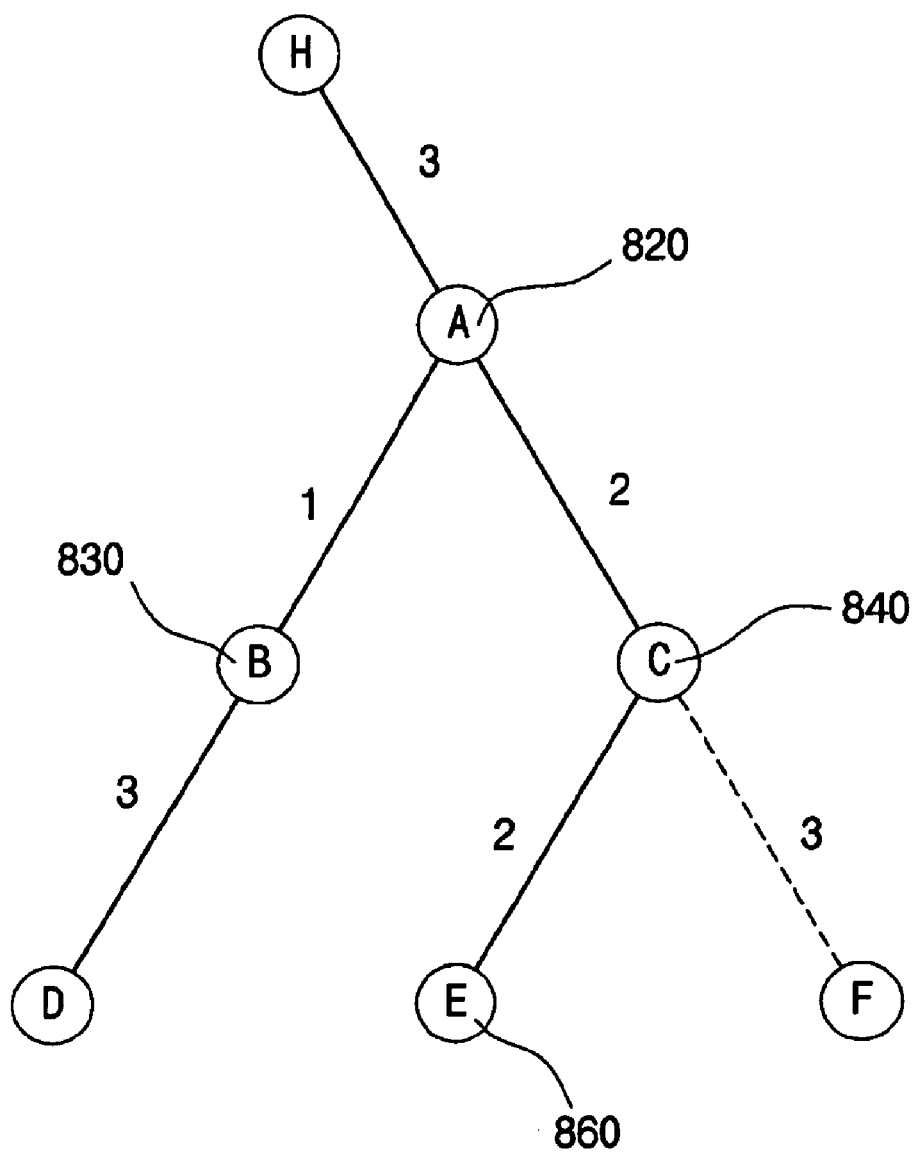
FIG. 8C is a network topology after channel assignment by distributed processing according to an exemplary embodiment of the invention.

FIG. 8C is a network topology after channel assignment by distributed processing according to an exemplary embodiment of the invention.

When a router changes its channel in response to the arrival of a channel assignment request message, the channel assignment is finished.

Referring to FIG. 8C, Channel 2 between the router 840 and the router 860 is newly assigned in response to the channel assignment request message that the router 840 sent to the router 860. On the other hand, Channel 1 between the router 830 and the router 860 is terminated.

As set forth above, the hybrid channel assignment method of an exemplary embodiment of the invention can assign channels using both centralized processing and distributed processing in order to ensure optimally correct channel assignment consistent with present traffic characteristics. This as a result can prevent network resources from being wasted and also increases network capacity, thereby optimizing effective use of the network resources.

According to the hybrid channel assignment method of an exemplary embodiment of the invention, it is not required to designate a specific server as a channel assignment server. Even if a specific server is designated as a channel assignment server, network performance can also be maintained by distributed processing. This is efficient in terms of network stability, which can reduce network management cost.

While certain exemplary embodiments of the invention have been shown and described herein with reference to certain preferred embodiments thereof, it will be understood by those skilled in the art that various changes in form and details may be made therein without departing from the spirit and scope of the invention as defined by the appended claims and their equivalents.

What is claimed is:

1. A hybrid channel assignment method comprising the steps of:

negotiating among routers to select one router to act as a central server;

collecting, at the selected router, information on an entire network transmitted from the other routers, and assigning channels based upon the information on the entire network;

setting, by the selected router with reference to the information transmitted from the other routers, a channel that is changed by distributed channel assignment as a reallocable link and a channel that is only changed by centralized channel assignment as a non-reallocable link;

reassigning channels of respective routers based upon dynamically-changing traffic characteristics; and setting a non-reallocable link when an amount of traffic exceeding a first reference value is conveyed;

setting a non-reallocable link when a number of channels generated after centralized channel assignment is greater than a second reference value; and setting a non-reallocable link when a number of channels terminated after centralized channel assignment is greater than a third reference value, whereby the selected router enables a hybrid centralized and distributed channel assignment.

2. The hybrid channel assignment method according to claim 1, wherein assigning by the selected router comprises setting a link, through which real-time traffic is conveyed as the non-reallocable link.

3. The hybrid channel assignment method according to claim 2, wherein other links, except for the non-reallocable link, are set as reallocable links.

4. The hybrid channel assignment method according to claim 3, wherein a router, which is assigned to the reallocable links, reassigns a channel based upon dynamically-changing traffic characteristics.

5. The hybrid channel assignment method according to claim 2, wherein a router, which is assigned to non-reallocable links, maintains a channel assigned by the selected router.

6. The hybrid channel assignment method according to claim 2, wherein the non-reallocable link is reassigned as a reallocable link when real-time traffic is not conveyed any longer through the non-reallocable link or an amount of traffic conveyed through the non-reallocable link does not exceed a predetermined reference value.

7. The hybrid channel assignment method according to claim 1, further comprising the step of:

transmitting a channel assignment request message including assigned channel information to the respective routers in a case of channel assignment or channel reassignment.

8. The hybrid channel assignment method according to claim 1, further comprising the step of:

reassigning a channel assigned to a link to a router, which did not transmit traffic information, based upon dynamically-changing traffic characteristics.

9. The hybrid channel assignment method according to claim 1, further comprising the step of:

reassigning channels of respective routers based upon dynamically-changing traffic characteristics if a flow considered in an assignment by the selected router is terminated.

10. The hybrid channel assignment method according to claim 1, further comprising the steps of:

comparing network performance resulting from an assignment at the selected router with that resulting from reassigning at respective routers; and reassigning, at the selected router, channels of the entire network if a compared performance difference is not smaller than a predetermined reference value.

11. A router comprising:

a traffic information collector for receiving traffic information from other routers and managing information on an entire network;

a reallocable link setter for setting a channel that is changed by distributed channel assignment as a reallocable link and a channel that is only changed by centralized channel assignment as a non-reallocable link with reference to the traffic information received in the traffic information collector; and a channel assigner for assigning channels with reference to the information on the entire network, wherein the channel assigner assigns a channel to a reallocable link based upon dynamically-changing traffic characteristics;

wherein the reallocable link setter sets a non-reallocable link when an amount of traffic exceeding a first reference value is conveyed;

wherein the reallocable link setter sets a non-reallocable link when a number of channels generated after centralized channel assignment is greater than a second reference value; and wherein the reallocable link setter sets a non-reallocable link when a number of channels terminated after centralized channel assignment is greater than a third reference value, whereby the router enables a hybrid centralized and distributed channel assignment.

12. The router according to claim 11, wherein the reallocable link setter sets a link, through which real-time traffic is conveyed as a non-reallocable link.

13. The router according to claim 12, wherein the reallocable link setter sets other links, except for the non-reallocable link, as reallocable links.

14. The router according to claim 11, wherein the reallocable link setter reassigns the non-reallocable link as a reallocable link when real-time traffic is not conveyed any longer through the non-reallocable link or an amount of traffic conveyed through the non-reallocable link does not exceed a predetermined reference value.

15. The router according to claim 11, wherein the channel assigner transmits a channel assignment request message including assigned channel information to respective other routers.

\* \* \* \* \*